United States Patent
Etgen

(10) Patent No.: US 7,716,602 B2
(45) Date of Patent: *May 11, 2010

(54) ACCESSIBLE MARKUP LANGUAGE DEFINED SLIDER CONTROL

(75) Inventor: Michael P. Etgen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/108,893

(22) Filed: Apr. 24, 2008

(65) Prior Publication Data

US 2008/0201663 A1      Aug. 21, 2008

Related U.S. Application Data

(63) Continuation of application No. 10/973,122, filed on Oct. 26, 2004, now Pat. No. 7,370,286.

(51) Int. Cl.
*G06F 3/048* (2006.01)

(52) U.S. Cl. ...................................... 715/833; 715/780

(58) Field of Classification Search ................ 715/833, 715/513, 780, 974
See application file for complete search history.

(56) References Cited

U.S. PATENT DOCUMENTS

| 5,877,758 | A | 3/1999 | Seybold |
| 6,324,511 | B1 * | 11/2001 | Kiraly et al. ................ 704/260 |
| 6,452,609 | B1 | 9/2002 | Katinsky |
| 6,456,305 | B1 | 9/2002 | Qureshi |
| 6,473,104 | B1 | 10/2002 | Harris |
| 6,667,751 | B1 | 12/2003 | Wynn |
| 6,670,972 | B2 | 12/2003 | Grieve |
| 6,674,450 | B1 | 1/2004 | Toub |
| 6,907,580 | B2 * | 6/2005 | Michelman et al. ......... 715/856 |
| 2002/0018075 | A1 | 2/2002 | Maulik |
| 2002/0149619 | A1 * | 10/2002 | Sauer .......................... 345/762 |
| 2002/0154273 | A1 | 10/2002 | Seo |
| 2003/0020761 | A1 | 1/2003 | Yanatsubo |
| 2003/0028801 | A1 * | 2/2003 | Liberman et al. ........... 713/200 |
| 2004/0008225 | A1 | 1/2004 | Campbell |
| 2004/0119753 | A1 | 6/2004 | Zencke |
| 2004/0148307 | A1 | 7/2004 | Rempell |
| 2005/0086587 | A1 * | 4/2005 | Balz ........................... 715/505 |
| 2006/0031187 | A1 * | 2/2006 | Pyrce et al. ................... 707/1 |

* cited by examiner

*Primary Examiner*—Kieu Vu
*Assistant Examiner*—Omar Abdul-Ali
(74) *Attorney, Agent, or Firm*—Jeanine S. Ray-Yarletts, Esq.; Steven M. Greenberg, Esq.; Carey, Rodriguez, Greenberg & Paul, LLP

(57) ABSTRACT

An accessible markup language specified slider control. A slider control which has been configured for rendering in a content browser in accordance with the present invention can include a script controlled slider track; a markup language specified text input field; and, coordination and control logic coupled both to the slider track and the text input field to harmonize a position of the slider track and a value specified in the text input field. The markup language specified text input field and the script controlled slider track can be defined in a DHTML document. Moreover, the coordination and control logic further can include a coupling to browser settings for the content browser to selectively enable and disable the slider track based upon the browser settings.

3 Claims, 2 Drawing Sheets

ACCESSIBLE MARKUP LANGUAGE DEFINED SLIDER CONTROL

CROSS-REFERENCE TO RELATED APPLICATIONS

This application is a Continuation of U.S. application Ser. No. 10/973,122, filed on Oct. 26, 2004, which is incorporated herein by reference in its entirety.

BACKGROUND OF THE INVENTION

1. Statement of the Technical Field

The present invention relates to processing a dynamic markup language document specified computer program and more particularly to an accessible slider control defined within a dynamic markup language specified computer program.

2. Description of the Related Art

Prior to the popularization of the Internet and the subsequent implementation of the World Wide Web ("the Web"), software publishers typically distributed computer applications via storage media such as a computer diskette or compact disc. Initially, such stand-alone computer applications included underlying program logic, data storage and, optionally, a user interface. Recently, given the popularization of the Internet and the Web, it is no longer reasonable to presume that computer applications are distributed exclusively via disk medium. Rather, in many cases, conventional computer programs are distributed electronically via the Internet. More importantly, however, in many cases computer applications are no longer distributed as stand-alone executable programs. Rather, many computer applications are distributed as markup language specified, browser based applications which can include a collection of hypermedia documents such as Web pages which can be viewed in hypermedia content browsers such as Web browsers.

In the case of a markup language specified computer program, users can interact with the underlying program logic not through a traditional GUI, but through a GUI provided by GUI elements embedded in a hypermedia document displayed in a content browser. Specifically, conventional markup can specify a user interface and corresponding logic which can be processed and rendered through use of a content browser. Content browsers, in turn, can process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup.

Markup language defined applications often have the need to present a user interface control in which a bounded range value must be specified. Slider controls which generally are well-known in the art, often are applied to control the specification of a bounded range in a GUI. In the prototypical slider control, a graphical control point can slide along a "track" that has both starting and ending points which correspond to the bounds of a valid entry range. Accordingly, given the clear importance of the slider control, though static markup languages do not provide a built-in mechanism for a slider control, dynamic forms of markup languages have been able to emulate the slider control.

Concurrently with the development of markup language defined applications, for more than ten years, computer scientists and engineers have addressed the accessibility of the computer program user interface—particularly for the benefit of those end users unable to interact with a computer program utilizing conventional means such as a mouse or keyboard. Presently, several assistive technologies have been widely distributed, usually in concert with the distribution of an operating system, to provide one or more alternative user interface mechanisms for the purpose of enhanced accessibility. Examples of assistive technologies include an audio user interface such as a screen reader.

Assistive technologies have proven to be highly successful among visually challenged computing end users. Yet, assistive technologies have not yet adapted to the underlying changes in respect to the modem form of the computer program. Specifically, whereas in a conventionally distributed computer program, assistive technologies like the screen reader can be easily enabled, markup language specified computer programs have not yet enjoyed the comprehensive integration of assistive technologies. In particular, dynamic implementations of markup languages and scripting aspects of markup languages, such as the popular dynamic hypertext markup language (DHTML) cannot always support important aspects of assistive technologies such as precise user interface element focus establishment.

In fact, it is well known that DHTML specified applications defining certain, complex user interface widgets cannot support accessible tabbing across constituent elements. Consequently, heretofore the specification of a slider control in a dynamic markup language cannot also enjoy the accessibility provided by assistive technologies. Accordingly, applications developers often must choose between providing a technically simplified albeit accessible markup language specified application, and providing a technologically advanced DHTML specified application which lacks desired accessibility features.

SUMMARY OF THE INVENTION

The present invention addresses the deficiencies of the art in respect to markup language defined computer programs and provides a novel and non-obvious accessible markup language specified slider control. In this regard, a slider control which has been configured for rendering in a content browser in accordance with the present invention can include a script controlled slider track; a markup language specified text input field; and, coordination and control logic coupled both to the slider track and the text input field to harmonize a position of the slider track and a value specified in the text input field. The markup language specified text input field and the script controlled slider track can be defined in a DHTML document. Moreover, the coordination and control logic further can include a coupling to browser settings for the content browser to selectively enable and disable the slider track based upon the browser settings.

A method for managing a slider control in a markup language specified computer program can include detecting user manipulation of one of a slider track and a text input field in the slider control and, responsive to the detection, harmonizing a position of the slider track with a value disposed in the text input field. The method further can include determining whether a content browser hosting the markup language specified computer program is enabled to process script logic in the markup language specified computer program. If the content browser hosting the markup language specified computer program is not enabled to process script logic in the markup language specified computer program, the slider track can be disabled in the slider control. Finally, the method can include detecting a changed value in the text input field; and, the changed value to a communicatively coupled assistive tool.

Additional aspects of the invention will be set forth in part in the description which follows, and in part will be obvious from the description, or may be learned by of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is an accessible markup language defined slider control. In accordance with the present invention, an accessible markup language defined slider control can include a static markup specified text field disposed in a script managed slider track. Either the text field or the slider track can be manipulated to specify a value bounded by the upper and lower endpoints of a range defined by the slider control. To that end, coordination and control logic can manage the harmonization of operation of the slider track and the text field. Importantly, to enable and preserve accessibility for the slider control, the slider track can be disabled where a host content browser cannot support the operation of a script, while the text field can remain operable to support interactions with an assistive tool.

Figure 1:
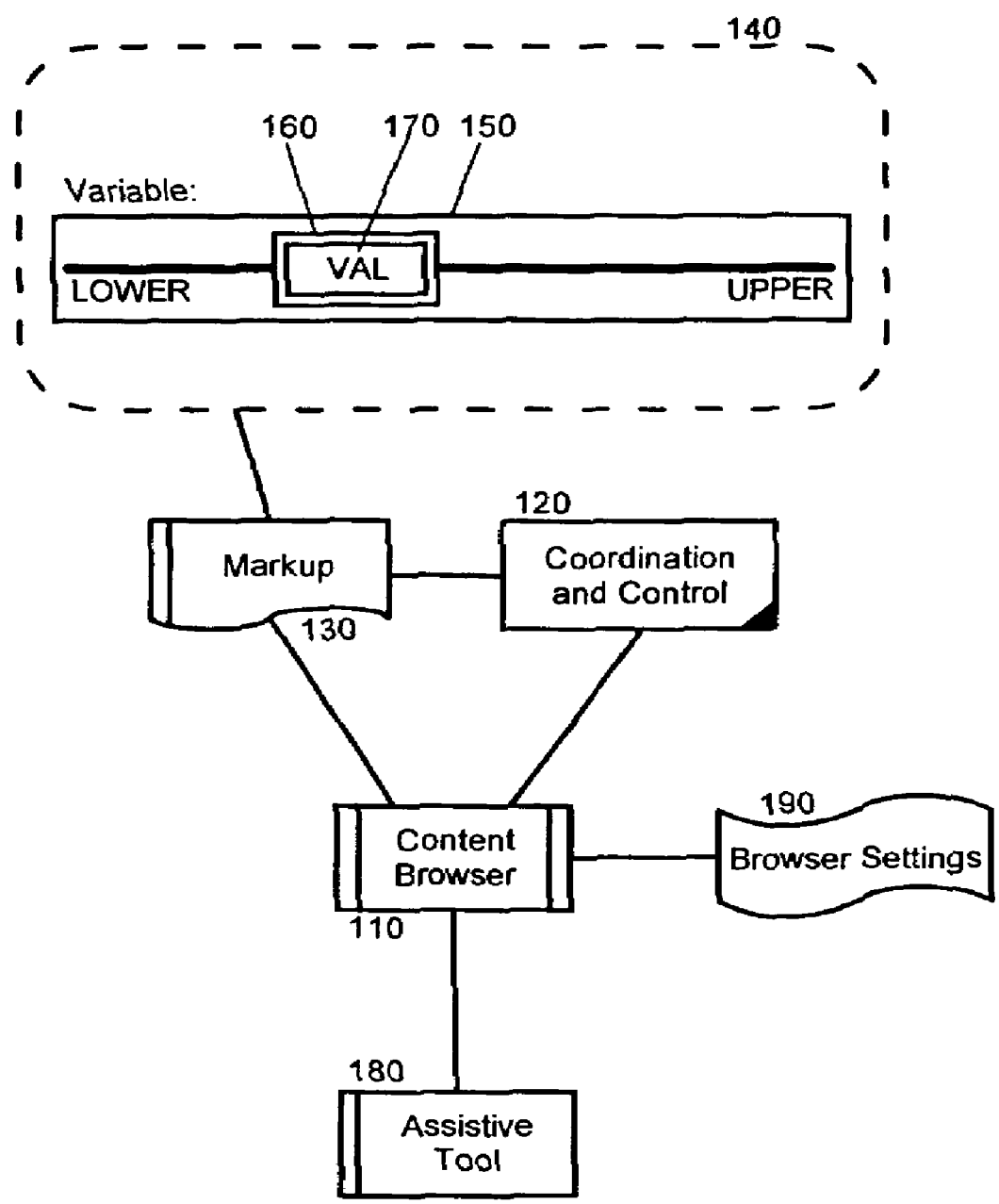
FIG. 1 is a schematic illustration of a system for managing an accessible markup language defined slider control; and, FIG. 2 is a flow chart illustrating a process for managing an accessible markup language defined slider control.

In further illustration, FIG. 1 is a schematic illustration of a system for managing an accessible markup language defined slider control. As shown in FIG. 1, the system can include a content browser 110 configured to process markup 130 to render a markup language specified program 140. In a particular aspect of the present invention, the markup 130 can be a dynamic markup language specified document, such as a DHTML specified document. Notably, a slider control 150 can be defined by the markup 130 for rendering in the content browser 110. In this regard, both static markup language attributes and script logic disposed in the markup 130 can combine to define the appearance, placement and functionality of the slider control 150 in the markup language specified computer program 140.

More particularly, the slider control 150 can include both a text field control 170 and a slider track 160. Script logic included as part of the slider control 150 can control the operation of the slider track 10 such that the physical positioning of the slider track 160 can produce a value for the variable bounded by the lower and upper endpoints of the range of the slider control 150. By comparison, static markup also included as part of the slider control 150 further can provide an input field for accepting a value for the variable bounded by the lower and upper endpoints of the range of the slider control 150. Accordingly, the slider control 140 can accept input for a specified variable, which variable can be bounded by a range having an upper endpoint and a lower endpoint, through either the slider track 160 or the text field 170.

To harmonize the use of either or both of the slider track 160 and the text field 170, coordination and control logic 120 can be coupled to or disposed in the markup 130. The coordination and control logic 120 can process text input in the text field 170 to programmatically adjust the slider track 160 as if an end user had directly manipulated the slider track 160. Conversely, the coordination and control logic 120 can process movement of the slider track 160 to programmatically adjust the value displayed in the text field 170 as if an end user had directly provided input to the text field 170.

Importantly, to ensure graceful degrading where the content browser 110 cannot process script logic according to browser settings 190, the coordination and control logic 120 can disable the slider track 160 in such circumstances while providing the text field 170 as the sole mode of providing a value in the slider control 150. In this way, compatibility with a coupled assistive tool 180 can be ensured. Of course, where both the slider track 160 and the text field 170 have been activated, the harmonization of the slider track 160 with the value displayed in the text field 170 can ensure proper compatibility with the coupled assistive tool 180.

Figure 2:
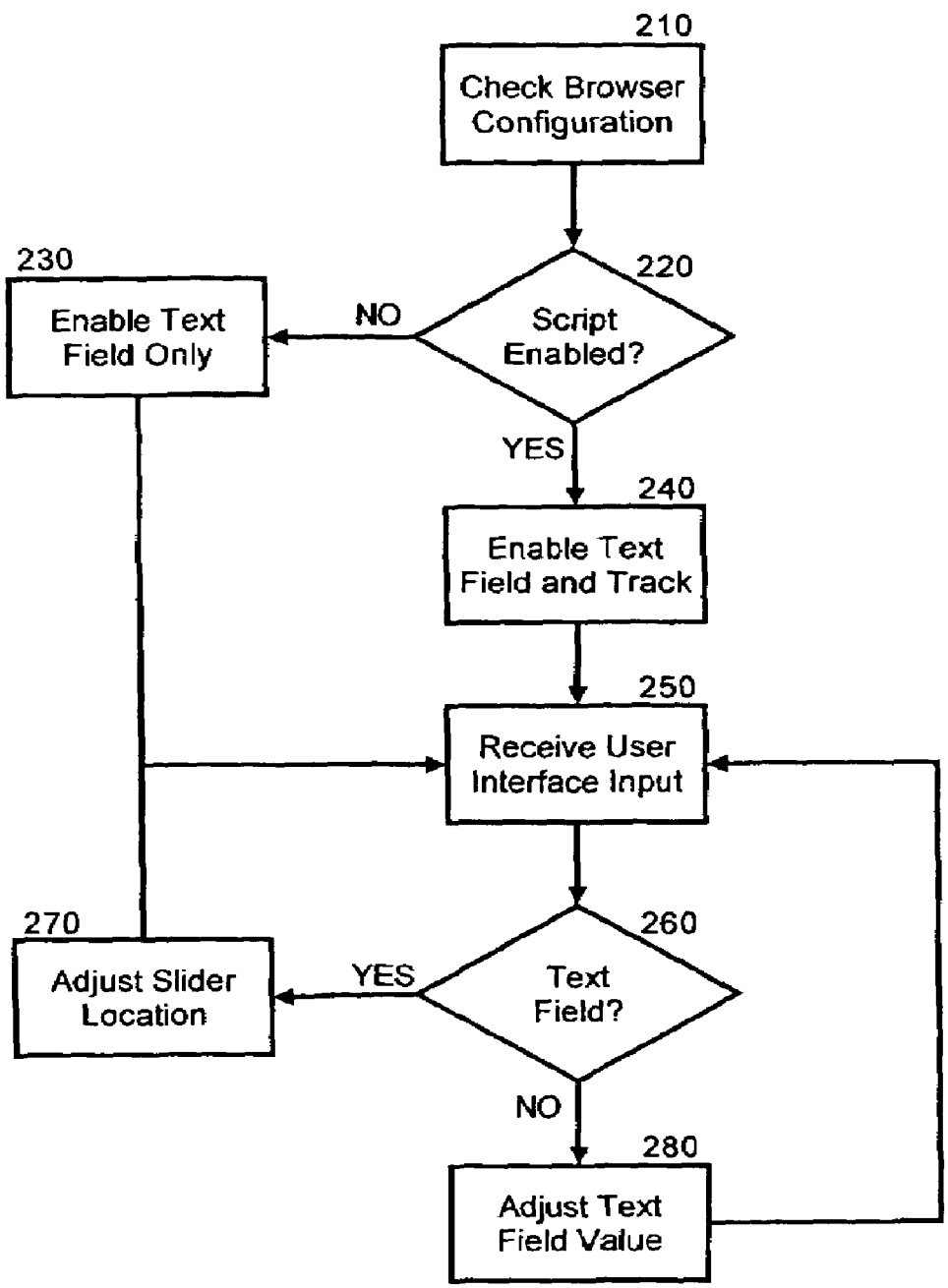

In further illustration, FIG. 2 is a flow chart illustrating a process for managing an accessible markup language defined slider control. Initially, when the markup first is loaded, in block 210 the browser configuration for the content browser can be checked and in decision block 220 it can be determined whether the content browser can process script logic in the markup. If not, in block 230 only the text field in the slider control can be enabled. Otherwise, in block 240 both the text field and slider track in the slider control can be enabled.

In either case, in block 250 user input can be accepted through the user interface defined by the markup. When interaction is detected with the slider control, in decision block 260 it can be determined whether the interaction has occurred in the text field or in the slider track. If it is determined that the interaction has occurred in the text field, in block 270 the slider track can be adjusted to a location consistent with the new value in the text field. Similarly, if it is determined that the interaction has occurred in the slider track, in block 280 the text field value can be changed to correspond to the value associated with the new position of the slider track. Again, in either case, the integration of the text field in the slider control can ensure accessibility in respect to the operation of the slider control in the user interface defined by the markup.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A slider control rendered in a content browser within a computer, the slider control comprising:
   a script controlled slider track;
   a markup language specified text input field; and,
   coordination and control logic coupled both to said slider track and said text input field to harmonize a position of said slider track and a value specified in said text input field, wherein the slider control is configured to:
   determine whether said content browser hosting the slider control markup is enabled to process script logic, and
   disable said slider track in the slider control upon said content browser not being enabled to process script logic, and wherein
   upon the slider track in the slider control being disabled, the text input field being enabled.

2. The slider control of claim 1, wherein said markup language specified text input field and said script controlled slider track are defined in a dynamic hypertext markup language (DHTML) document.

3. The slider control of claim 1, wherein said coordination and control logic further comprises a coupling to browser settings for the content browser to selectively enable and disable said slider track based upon said browser settings.

* * * * *